Feb. 26, 1957  S. J. FRANCIS ET AL  2,782,696
MANUFACTURE OF METAL GRATING
Filed March 24, 1953

INVENTOR.
Sidney James Francis
and Henry Joseph Carter,
BY Wendereth, Lind and Ponack
ATTYS.

United States Patent Office 2,782,696
Patented Feb. 26, 1957

2,782,696

MANUFACTURE OF METAL GRATING

Sidney James Francis and Henry Joseph Carter, Benoni, Transvaal, Union of South Africa, assignors to New Era Engineers (Proprietary) Limited, Springs, Transvaal, Union of South Africa Application March 24, 1953, Serial No. 344,394

Claims priority, application Union of South Africa March 25, 1952

3 Claims. (Cl. 94—30)

This invention relates to the manufacture of metal grating such as is widely used in the construction of platforms, stair treads, flooring and the like. It relates more particularly to the kind of grating which is known in the engineering industries as "egg-grating" and provides an improved form of such article or product and a method of manufacturing the same economically from metal sheet or plate. The grating is characterised by its exceptional strength having regard to the sheet or plate metal employed in its manufacture, which strength is achieved by the manner in which its component elements, in crossing one another in the desired reticulate formation, are mutually interlocked to produce, in a relatively light product affording a good non-slip surface, a high resistance to bending which is of much importance where the product is to be put to uses as above indicated.

According to the invention a grating is provided having crossing sets of parallel bars, each bar having a continuous elongated edge, the opposite edge being provided with spaced relatively wide notches having oppositely inclined lugs projecting from opposite sides of each notch and being substantially parallel to each other, the two sets of bars being reversed with the notches of one set interlocking with the notches of the other set, the ends of the oppositely inclined lugs of one set of bars contacting or abutting the continuous portions of the second set of bars and with the lower edges of the lugs of one set in contact with the upper edges of the lugs of the other set to lock the bars in place.

The said notches may be of half-bar depth whereby, upon assembly, the resultant grating has the thickness or depth equal to the width of the bars. Preferably, the extremities of the lugs of each set of bars are arranged to make contact with the continuous portions of the opposing bars, e. g. as a means of positioning the two sets of bars fairly at right angles in the assembling operation before these are welded, brazed or otherwise fixed permanently together.

The bars, of any desired lengths and numbers, being assembled as above and interlocked in generally square or rhombic-net formation, the whole may easily be fixed rigidly in this condition by localised welding, brazing or soldering at a sufficient number of distributed points, e. g. where edges of crossing continuous portions of bars meet one another, and/or elsewhere.

Using bars of one selected width throughout and making the lugs of each bar equal in width to its continuous portion, when the bars are crossed and fitted together as aforesaid, the resultant grating product will have a thickness equal to the bar width and each of the sides of the product will be defined by the continuous outer edges of some of the bars running in one direction and the outer edges of the lugs of the other bars running generally obliquely to that direction.

By making the width of the lugs of each bar different from, e. g. less than that of the adjacent continuous portion, the sides of the resultant grating product may comprise lug outer edges and continuous portion outer edges out of planar alignment with one another.

Again, by using bars of one selected width for running in one direction in the finished product, and bars of greater width for running across the first bars in the product, the latter may on one side comprise lug edges and continuous edges in planar or substantially planar coincidence, and on the other side for instance all the continuous edges aligned in a plane and all the lug edges in another plane located nearer to the first side of the product.

The invention also consists in "egg-grating" substantially as hereinafter set forth.

Referring now to the accompanying drawings:

Figure 3 is a fragmentary perspective semi-plan view, to a somewhat reduced scale, showing the general appearance of the same panel or the like.

Figure 1:
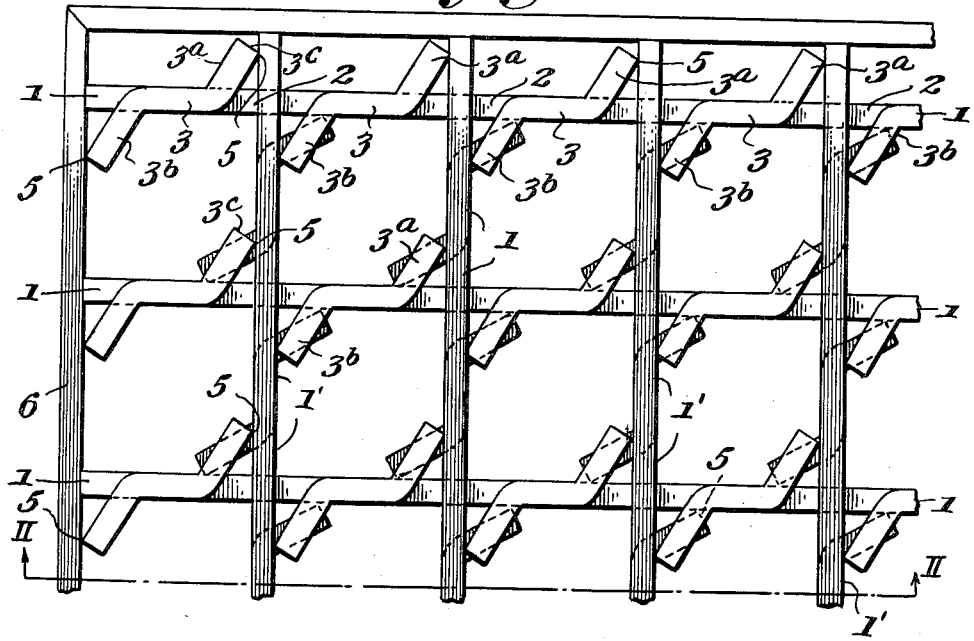
Figure 1 is a fragmentary plan view of one corner of an "egg-grating" panel or the like made up according to the present invention.
Figure 2:
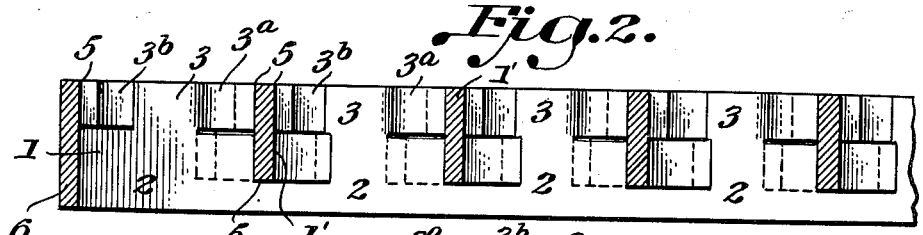
Figure 2 is a section on the line II—II of Figure 1.
Figure 3:
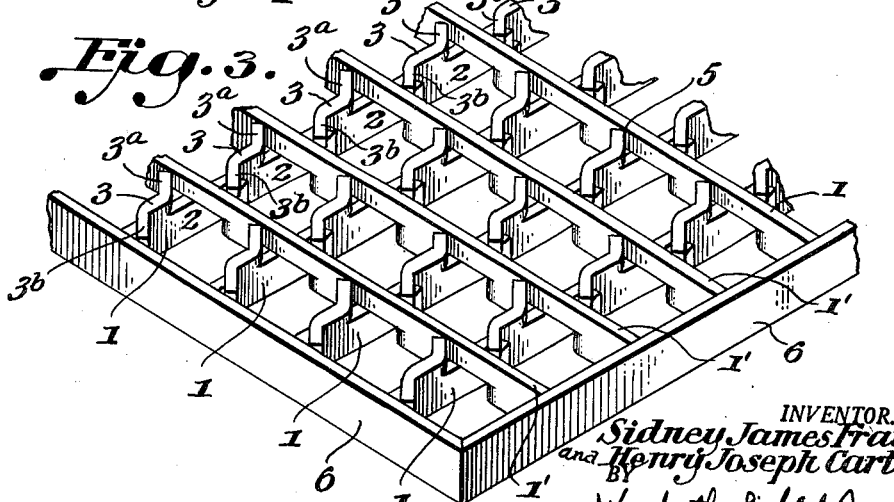

In the drawings one set of bars is constituted by steel strips 1 running parallel with one another across or along the product comprising the grating. Each strip comprises a continuous elongated edge portion 2 constituting somewhat more than one half of the strip width. The remainder of the width of each strip 1 is provided with a plurality of spaced relatively wide notches 4 having oppositely inclined lugs 3a and 3b projecting from opposite sides of each notch 4 at an angle somewhat less than 90 degrees from an integral part 3, of the strip 1, which part forms a common root for the said lugs 3a and 3b. The oppositely inclined lugs are substantially parallel with each other.

The second set of bars running at right angles to the strips 1 and parallel with one another are constituted by steel strips 1' of substantially similar construction to strips 1 but assembled in an inverted sense so that their corresponding notches 4' interlock with the notches 4 of the strips 1, while at the same time the upper edges of the lugs 3a and 3b thereon make contact with the lower edges of the corresponding lugs 3a and 3b on the strips 1 as clearly shown in Figure 1.

Preferably also the extremities 3c of the lugs 3a and 3b of each set are arranged to make contact as at 5 with the continuous elongated edge portions 2 of opposing strips, e. g. as a means for positioning the two sets of strips fairly at right angles in the assembling operation before these are welded, brazed or otherwise fixed permanently together.

The reticulate grating product obtained by assembling the prepared strips in the manner set forth above may be of any desired dimensions and may be marginally bounded (or otherwise reinforced) in any way, as for instance by fitting it into or fitting around it and suitably securing a steel or other frame or the like of suitable construction and configuration, for example composed of plain strips 6 of similar width to the wider strips 1 employed in the particular construction illustrated in the drawings.

For economical production of the component strips on a large scale and with the degree of accuracy of partial shearing and lug bending essential to their being assembled satisfactorily into the final "egg-grating" condition, use is preferably made of a suitable construction of heavy-duty press comprising dies having profiles by which the flat strip or blank of desired gauge and width may be brought to the shape aforesaid in a single pressing operation.

What we claim is:

1. A grating having crossing sets of parallel bars, each bar having a continuous elongated edge, the opposite edge being provided with spaced relatively wide notches having oppositely inclined lugs projecting from opposite sides of each notch and being substantially parallel to each other, the two sets of bars being reversed with the notches of one set interlocking with the notches of the other set, the ends of the oppositely inclined lugs of one set of bars contacting or abutting the continuous portions of the second set of bars and with the lower edges of the lugs of one set in contact with the upper edges of the lugs of the other set to lock the bars in place.

2. A grating as claimed in claim 1 and means connecting said two sets of bars to each other at distributed contacting points.

3. A grating as claimed in claim 1, wherein a set of bars of one selected width is arranged to run in one direction, and a set of bars of a greater width are arranged to run across the first set, whereby the grating comprises on one side, lug outer edges and continuous edges in substantially planar coincidence and on the other side, all the continuous edges aligned in one plane, and all the lug outer edges in another plane.

References Cited in the file of this patent

UNITED STATES PATENTS

| | | |
|---|---|---|
| 1,022,387 | Czimeg | Apr. 2, 1912 |
| 1,346,426 | Scherbner | July 13, 1920 |
| 2,099,517 | Hayes | Nov. 16, 1937 |
| 2,290,746 | Gray | July 21, 1942 |